US012623852B2

(12) United States Patent
Sasaki et al.

(10) Patent No.: US 12,623,852 B2
(45) Date of Patent: May 12, 2026

(54) STRAIGHT AND CURVED GUIDE RAIL AND STRAIGHT AND CURVED GUIDE DEVICE

(71) Applicant: NIPPON THOMPSON CO., LTD.,
Tokyo (JP)

(72) Inventors: Satoshi Sasaki, Mino (JP); Daisuke Sato, Mino (JP); Yuichi Shibuya, Mino (JP)

(73) Assignee: NIPPON THOMPSON CO., LTD.,
Tokyo (JP)

( * ) Notice: Subject to any disclaimer, the term of this patent is extended or adjusted under 35 U.S.C. 154(b) by 50 days.

(21) Appl. No.: 18/712,856

(22) PCT Filed: Nov. 9, 2022

(86) PCT No.: PCT/JP2022/041666
§ 371 (c)(1),
(2) Date: May 23, 2024

(87) PCT Pub. No.: WO2023/095612
PCT Pub. Date: Jun. 1, 2023

(65) Prior Publication Data
US 2024/0352964 A1 Oct. 24, 2024

(30) Foreign Application Priority Data

Nov. 26, 2021 (JP) ................................. 2021-191740

(51) Int. Cl.
B65G 21/22 (2006.01)
B65G 39/18 (2006.01)
(52) U.S. Cl.
CPC .................................... B65G 39/18 (2013.01)

(58) Field of Classification Search
CPC ........ B65G 21/22; B65G 39/18; F16C 29/005
(Continued)

(56) References Cited

U.S. PATENT DOCUMENTS 9,446,902 B2 * 9/2016 Aumann ................ B65G 54/02
10,106,339 B2 * 10/2018 Prüssmeier ............ B65G 35/06
(Continued)

FOREIGN PATENT DOCUMENTS

DE 196 15 465 A1 10/1997
DE 199 34 754 A1 5/2001
(Continued)

OTHER PUBLICATIONS

Dec. 13, 2022 Search Report issued in International Patent Application No. PCT/JP2022/041666.

*Primary Examiner* — Douglas A Hess
(74) *Attorney, Agent, or Firm* — Oliff PLC

(57) ABSTRACT

A straight-curved guide rail includes a straight part and a curved part and is configured to guide movement of a movable element. The straight-curved guide rail includes: a base part extending in a longitudinal direction of the straight-curved guide rail; and a track part, which is formed on the base part, extends in the longitudinal direction, and has a pair of rail ends, each including a track surface to be in contact with the movable element, on both side portions of the straight-curved guide rail in a width direction of the straight-curved guide rail. A region of the straight-curved guide rail, which includes an end portion of the straight-curved guide rail in the longitudinal direction, includes a low-stiffness region in which portions including the track surfaces have lower stiffness than stiffness of other region.

12 Claims, 16 Drawing Sheets

(58) Field of Classification Search
USPC .......................................................... 198/779
See application file for complete search history.

(56) References Cited

U.S. PATENT DOCUMENTS

| | | | | |
|---|---|---|---|---|
| 10,399,779 B2 * | 9/2019 | Fenile | ................. | B65G 19/025 |
| 10,587,212 B1 * | 3/2020 | Van Dorpe | ............ | H02K 11/30 |
| 11,198,564 B2 * | 12/2021 | Monti | ................... | F16C 13/006 |
| 11,492,206 B2 * | 11/2022 | Götzinger | ............ | B65G 17/123 |
| 12,022,887 B2 * | 7/2024 | Testoni | ................. | B65B 65/003 |
| 2021/0139249 A1 | 5/2021 | Monti | | |

FOREIGN PATENT DOCUMENTS

| | | | | | | |
|---|---|---|---|---|---|---|
| EP | 3626986 | B1 | * | 12/2021 | ............ | B65G 35/06 |
| GB | 2600726 | A | * | 5/2022 | ............ | B65G 35/00 |
| JP | 2007-205479 | A | | 8/2007 | | |
| JP | 2014-163483 | A | | 9/2014 | | |
| JP | 2016-166634 | A | | 9/2016 | | |
| WO | WO-2009003843 | A2 | * | 1/2009 | ............ | F16C 29/005 |

* cited by examiner

STRAIGHT AND CURVED GUIDE RAIL AND STRAIGHT AND CURVED GUIDE DEVICE

TECHNICAL FIELD

The present disclosure relates to a straight-curved guide rail and a straight-curved guide device including the straight-curved guide rail. This application claims priority from Japanese Patent Application No. 2021-191740, filed on Nov. 26, 2021, the contents of which are incorporated herein by reference in their entirety.

BACKGROUND ART

Hitherto, there has been known a guide device including a rail and a movable element being movable on the rail. This kind of technology is disclosed in, for example, Patent Literature 1 and Patent Literature 2.

In Patent Literature 1 and Patent Literature 2, there is disclosed a linear guide device including a rail, a slider, and a plurality of rolling elements. The slider is linearly movable on the rail. The plurality of rolling elements are arranged between the rail and the slider. In the linear guide device disclosed in Patent Literature 1, a slit having a predetermined depth in a height direction of the rail extends in a longitudinal direction of the rail from an end portion of the rail in the longitudinal direction. In the linear guide device disclosed in Patent Literature 2, a slit is formed in an end portion of the rail in a longitudinal direction of the rail in such a manner as to extend throughout the rail in its height direction.

CITATION LIST

Patent Literature

Patent Literature 1: JP 2014-163483 A
Patent Literature 2: JP 2016-166634 A

Summary of Invention

Technical Problem

In the guide devices, a plurality of rails are arranged in line in the longitudinal direction, and end portions of the rails in the longitudinal direction are connected to each other. In this case, when processing accuracy differs greatly among the rails, there arises a problem in that a large shock may be generated when the movable element is moved from one rail to another rail. In particular, a straight-curved guide rail including a curved part is liable to have lower processing accuracy than processing accuracy of a straight rail having no curved part.

An object of the present disclosure is to provide a straight-curved guide rail that enables suppression of a shock, which may be generated when a movable element is moved between a rail having low processing accuracy and a rail having high processing accuracy, and a straight-curved guide device including the straight-curved guide rail.

Solution to Problem

A straight-curved guide rail according to the present disclosure includes a straight part and a curved part and is configured to guide movement of a movable element. The straight-curved guide rail includes: a base part extending in a longitudinal direction of the straight-curved guide rail; and

2 a track part, which is formed on the base part, extends in the longitudinal direction, and has a pair of rail ends, each including a track surface to be in contact with the movable element, on both side portions of the straight-curved guide rail in a width direction of the straight-curved guide rail. A region of the straight-curved guide rail, which includes an end portion of the straight-curved guide rail in the longitudinal direction, includes a low-stiffness region in which portions including the track surfaces have lower stiffness than stiffness of other region.

A straight-curved guide device according to the present disclosure includes: the straight-curved guide rail; and a movable element being movable on the straight-curved guide rail.

Advantageous Effects of Invention

According to the present disclosure, the straight-curved guide rail that enables suppression of a shock, which may be generated when the movable element is moved between a rail having low processing accuracy and a rail having high processing accuracy, and the straight-curved guide device including the straight-curved guide rail can be provided.

BRIEF DESCRIPTION OF DRAWINGS

FIG. 19 is a perspective view for illustrating a configuration of the straight-curved guide rail according to the fifth embodiment.

DESCRIPTION OF EMBODIMENTS

Overview of Embodiments

Figure 1:
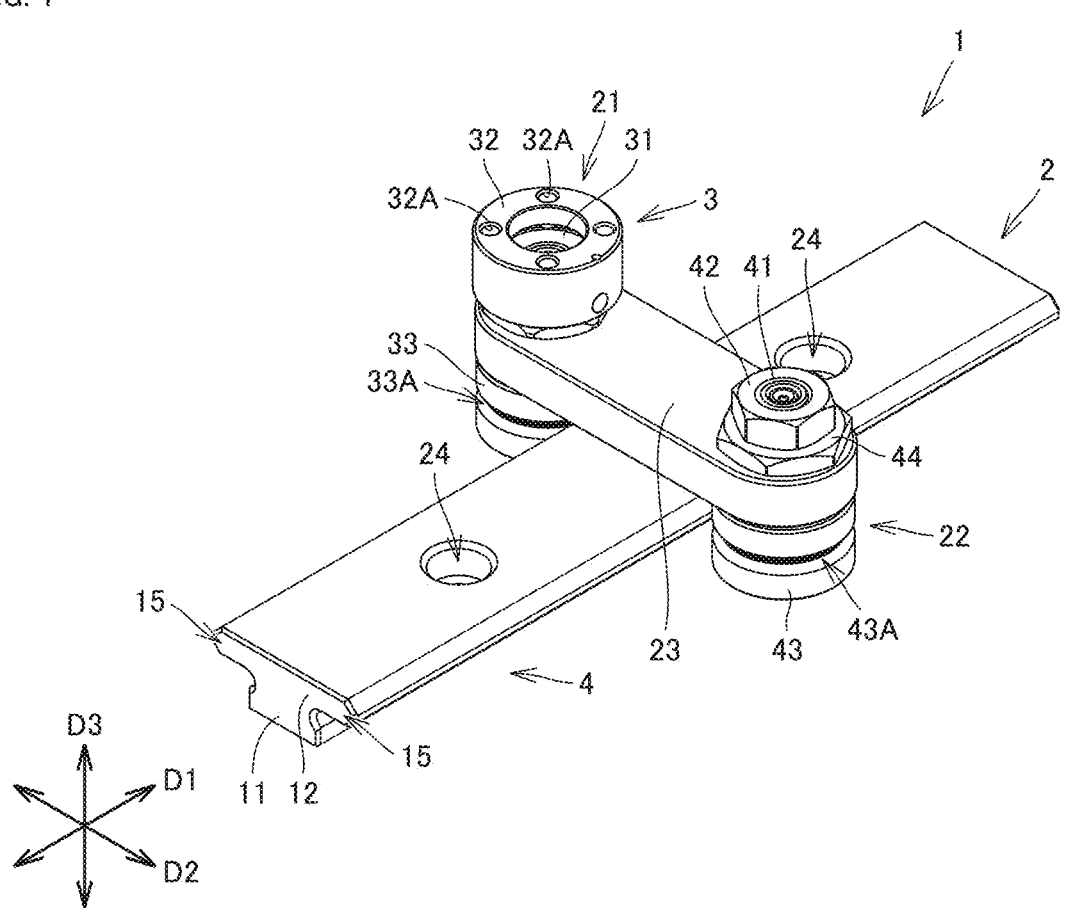
FIG. 1 is a perspective view for illustrating a configuration of a straight-curved guide device according to a first embodiment.

A straight-curved guide rail according to the present disclosure includes a straight part and a curved part and is configured to guide movement of a movable element. The straight-curved guide rail includes: a base part extending in a longitudinal direction of the straight-curved guide rail; and a track part, which is formed on the base part, extends in the longitudinal direction, and has a pair of rail ends, each including a track surface to be in contact with the movable element, on both side portions of the straight-curved guide rail in a width direction of the straight-curved guide rail. The straight-curved guide rail includes a low-stiffness region in which portions including the track surfaces have lower stiffness than stiffness of other region in a region including an end portion in the longitudinal direction.

In the straight-curved guide rail, in the low-stiffness region, the stiffness of the portions including the track surfaces is lower than that of other region. Thus, the track part is more likely to warp. Thus, a shock, which may be generated when the movable element is moved between a rail having low processing accuracy and a rail having high processing accuracy, can be mitigated through warping of the track part. Accordingly, with the straight-curved guide rail, a shock, which may be generated when the movable element is moved between the rail having low processing accuracy and the rail having high processing accuracy, can be suppressed.

In the straight-curved guide rail, the base part may include a first base part and a second base part in the low-stiffness region. The first base part has a smaller length in the width direction than a length of the track part in the width direction. The second base part connects the first base part and the track part to each other, and has a smaller length in the width direction than the length of the first base part in the width direction. With the configuration described above, the track part is more likely to warp in the low-stiffness region. Thus, a shock, which may be generated when the movable element is moved between the rails, can be more effectively suppressed.

In the straight-curved guide rail, the track part may include a first track part and a pair of second track parts. The first track part overlaps the base part in the height direction of the straight-curved guide rail. The pair of second track parts are formed on both sides of the first track part in the width direction and include a pair of rail ends. In the low-stiffness region, the track part may have a first cutout portion formed by cutting out a part of the track part from an end portion of the track part in the longitudinal direction so that the first track part and the second track parts are spatially separated from each other. With the configuration described above, the track part is further likely to warp in the low-stiffness region. Thus, a shock, which may be generated when the movable element is moved between the rails, can be further effectively suppressed.

In the straight-curved guide rail, the track part may include a first track part and a pair of second track parts. The first track part overlaps the base part in the height direction of the straight-curved guide rail. The pair of second track parts are formed on both sides of the first track part in the width direction and include a pair of rail ends. In the low-stiffness region, the track part may have a second cutout portion formed by removing the first track part from an end portion of the track part in the longitudinal direction. With the configuration described above, the track part is still more likely to warp in the low-stiffness region. Thus, a shock, which may be generated when the movable element is moved between the rails, can be still more effectively suppressed.

A straight-curved guide device according to the present disclosure includes the above-mentioned straight-curved guide rail and a movable element being movable on the straight-curved guide rail.

Specific Examples of Embodiments

Next, specific embodiments of a straight-curved guide rail and a straight-curved guide device according to the present disclosure are described with reference to the drawings. In the drawings referred to below, the same or corresponding portions are denoted by the same reference symbols, and a description thereof is not repeated.

First Embodiment

Figure 2:
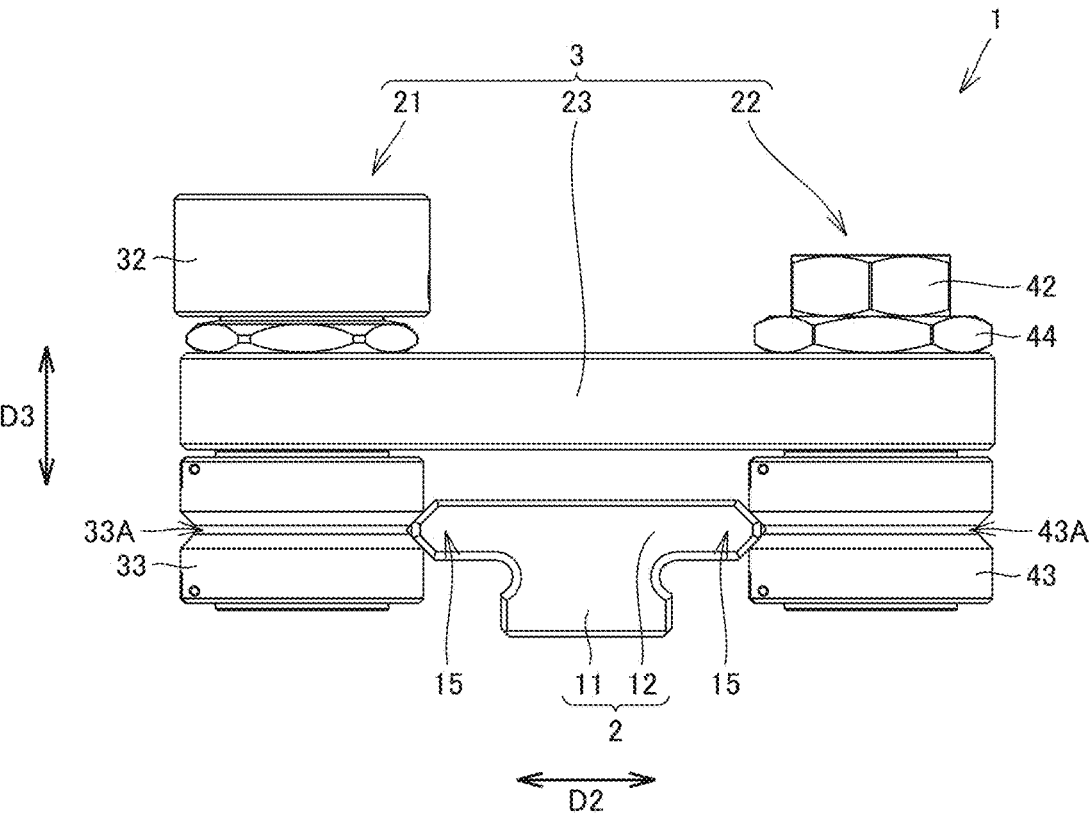
FIG. 2 is a view of the straight-curved guide device according to the first embodiment when viewed in a longitudinal direction of a straight-curved guide rail.
Figure 3:
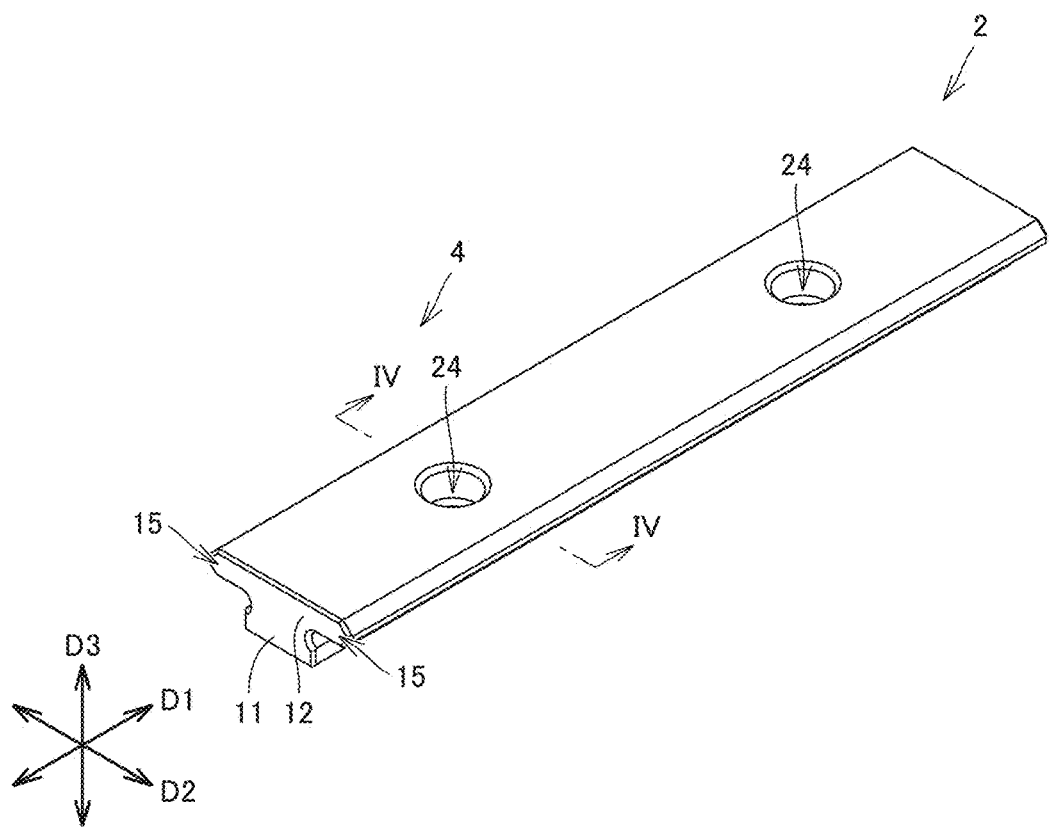
FIG. 3 is a perspective view for illustrating a configuration of the straight-curved guide rail according to the first embodiment.
Figure 4:
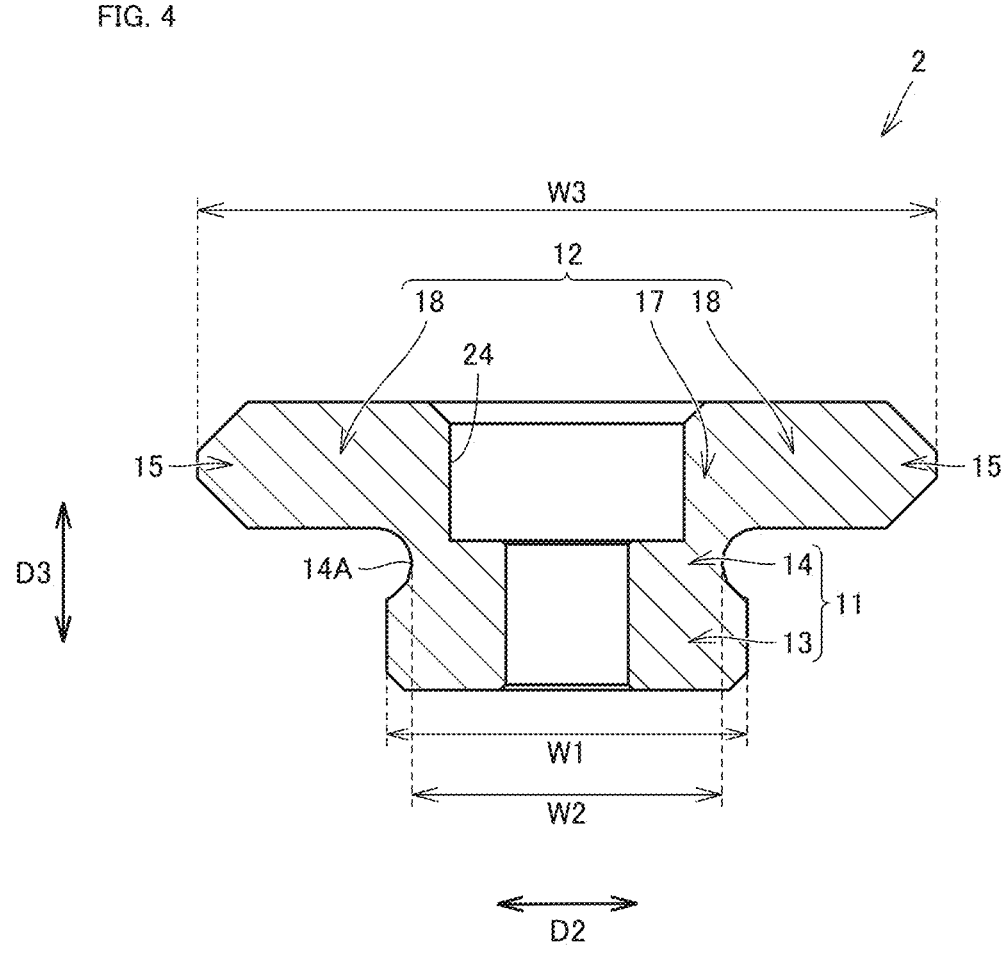
FIG. 4 is a sectional view of the straight-curved guide rail, taken along the line IV-IV of FIG. 3.

First, configurations of a straight-curved guide device 1 and a straight-curved guide rail 2 according to a first embodiment are described with reference to FIG. 1 to FIG. 4. FIG. 1 is a perspective view for illustrating a configuration of the straight-curved guide device 1. FIG. 2 is a view of the straight-curved guide device 1 when viewed in a longitudinal direction D1 of the straight-curved guide rail 2. FIG. 3 is a perspective view for illustrating a configuration of the straight-curved guide rail 2. FIG. 4 is a sectional view of the straight-curved guide rail 2, taken along the line IV-IV of FIG. 3. As illustrated in FIG. 1, the straight-curved guide device 1 includes the straight-curved guide rail 2 and a movable element 3 as main components. The movable element 3 is movable on the straight-curved guide rail 2.

The straight-curved guide rail 2 is configured to guide movement of the movable element 3. In FIG. 1 and FIG. 3, only a part (low-stiffness region 4) of the straight-curved guide rail 2 is illustrated. The straight-curved guide rail 2 includes a straight part and a curved part. As illustrated in FIG. 1, the straight-curved guide rail 2 includes a base part 11 and a track part 12. The base part 11 extends in the longitudinal direction D1 of the straight-curved guide rail 2. The track part 12 is formed on the base part 11 and extends in the longitudinal direction D1. The track part 12 has a pair of rail ends 15 on both side portions of the straight-curved guide rail 2 in a width direction D2. The pair of rail ends 15 each include a track surface to be in contact with the movable element 3 (swing portion). As illustrated in FIG. 2, the rail end 15 in this embodiment is shaped such that its thickness in a height direction D3 of the straight-curved guide rail 2 decreases toward an outer side in the width direction D2. However, a shape of the rail end 15 is not limited to that described above.

As illustrated in FIG. 3, the straight-curved guide rail 2 has bolt holes 24 into which bolts for fixing the straight-curved guide rail 2 to a counterpart member (not shown) are inserted. The bolt holes 24 are formed apart from each other in the longitudinal direction D1. The bolt hole 24 is a circular hole when viewed in the height direction D3. As illustrated in FIG. 4, the bolt hole 24 is formed so as to pass through the straight-curved guide rail 2 in the height direction D3. More specifically, the bolt hole 24 includes a first hole and a second hole. The first hole is formed in the track part 12. The second hole is formed in the base part 11 and communicates with the first hole. The first hole is a portion into which a head portion of a bolt (not shown) is inserted. The second hole is a portion into which a shaft portion of the bolt is inserted and has an inner diameter smaller than that of the first hole.

As illustrated in FIG. 4, in the low-stiffness region 4, the base part 11 includes a first base part 13 and a second base part 14. The second base part 14 is formed on the first base part 13. A length W1 of the first base part 13 in the width direction D2 is smaller than a length W3 (length from one of the rail ends 15 to another one of the rail ends 15) of the track part 12 in the width direction D2.

The second base part 14 is a part that connects the first base part 13 and the track part 12 to each other. As illustrated in FIG. 4, a length W2 of the second base part 14 in the width direction D2 is smaller than the length W1 of the first base part 13 in the width direction D2. In this embodiment, in cross section (FIG. 4) of the straight-curved guide rail 2, which is taken in the height direction D3, an outer surface 14A of the second base part 14 in the width direction D2 is a curved surface that is inwardly curved in an arc-like manner in the width direction D2. However, the outer surface 14A is not limited to that described above.

In the straight-curved guide rail 2, the low-stiffness region 4 is included in a region including the end portion of the straight-curved guide rail 2 in the longitudinal direction D1 (FIG. 3). In the low-stiffness region 4, the length W2 of the second base part 14 in the width direction D2 is smaller than the length W1 of the first base part 13 in the width direction D2. As a result, stiffness of portions (rail ends 15) including the track surfaces is lower than that of other region (for example, a rail central region (not shown)).

As illustrated in FIG. 4, the track part 12 includes a first track part 17 and a pair of second track parts 18. The pair of second track parts 18 are formed on both sides of the first track part 17 in the width direction D2. The first track part 17 is a part that overlaps the base part 11 in the height direction D3. The second track parts 18 are parts located on an outer side of the base part 11 in the width direction D2 and include the rail ends 15.

As illustrated in FIG. 1, the movable element 3 is arranged across the straight-curved guide rail 2 in the width direction D2. The movable element 3 includes a first bearing portion 21, a second bearing portion 22, and an arm portion 23.

The arm portion 23 extends in the width direction D2 and is orthogonal to the straight-curved guide rail 2. As illustrated in FIG. 1, a length of the arm portion 23 in the width direction D2 is larger than a length of the straight-curved guide rail 2 in the width direction D2. The arm portion 23 is arranged above the straight-curved guide rail 2 in the height direction D3 in such a manner as to transverse the straight-curved guide rail 2.

The first bearing portion 21 is arranged on one side (one end) of the arm portion 23 when viewed from a center of the arm portion 23 in a longitudinal direction of the arm portion 23 (width direction D2 of the straight-curved guide rail 2). As illustrated in FIG. 1, the first bearing portion 21 includes a first shaft member 31 (first stud), a first outer ring 32, and a first guide roller 33. The first shaft member 31 passes through the arm portion 23 in the height direction D3 and is fixed to the one end of the arm portion 23 in its longitudinal direction.

The first outer ring 32 has a circular annular shape that surrounds an outer peripheral surface of the first shaft member 31 and is arranged on one end (upper end in FIG. 1) side of the first shaft member 31. Rolling elements (not shown), for example, cylindrical rollers are arranged side by side in a circumferential direction between a raceway surface formed on an outer peripheral surface of the one end of the first shaft member 31 and a raceway surface formed on an inner peripheral surface of the first outer ring 32. The first outer ring 32 is mounted to a frame (not shown) of the movable element 3. As illustrated in FIG. 1, a plurality of (four in this embodiment) bolt holes 32A are formed equiangularly in one end surface of the first outer ring 32. Each of the bolt holes 32A has a predetermined depth in the height direction D3 and is a female thread hole with a thread portion (not shown) in a wall surface. When bolts (not shown) are inserted into the bolt holes 32A, the first outer ring 32 is mounted to the frame. The arm portion 23 is not limited to that supported in a cantilever fashion by the frame on one end in the longitudinal direction as in this embodiment. For example, a central area of the arm portion 23 in the longitudinal direction may be mounted to the frame.

The first guide roller 33 is arranged on another end (lower end in FIG. 1) side of the first shaft member 31 so that the arm portion 23 is interposed between the first outer ring 32 and the first guide roller 33. The first guide roller 33 has a circular annular shape that surrounds the outer peripheral surface of the first shaft member 31. Rolling elements (not shown), for example, cylindrical rollers are arranged side by side in a circumferential direction between a raceway surface formed on an outer peripheral surface of the another end of the first shaft member 31 and a raceway surface formed on an inner peripheral surface of the first guide roller 33. As illustrated in FIG. 1, a first rail groove 33A having a circular annular shape, with which the rail end 15 (raceway surface) is to be in contact, is formed in an outer peripheral surface of the first guide roller 33.

The second bearing portion 22 is arranged on another side (another end) of the arm portion 23 when viewed from the center of the arm portion 23 in the longitudinal direction. As illustrated in FIG. 1, the second bearing portion 22 includes a second shaft member 41 (second stud), a nut 42, an eccentric collar 44, and a second guide roller 43.

The second shaft member 41 passes through the arm portion 23 in the height direction D3 and is fixed to the another end of the arm portion 23 in its longitudinal direction. The nut 42 is tightened onto a male thread portion formed on an outer peripheral surface of one end (upper end in FIG. 1) of the second shaft member 41. The eccentric collar 44 is a circular annular member having a radial thickness changing in a circumferential direction. The eccentric collar 44 is inserted into a gap defined between a wall surface of a through hole (not shown) of the arm portion 23, into which the second shaft member 41 is inserted, and an outer peripheral surface of the second shaft member 41.

The second guide roller 43 is arranged on another end (lower end in FIG. 1) side of the second shaft member 41 so that the arm portion 23 is interposed between the second guide roller 43 and the nut 42. The second guide roller 43 has a circular annular shape that surrounds the outer peripheral surface of the second shaft member 41. Rolling elements (not shown), for example, cylindrical rollers are arranged side by side in a circumferential direction between a raceway surface formed on an outer peripheral surface of the another end of the second shaft member 41 and a raceway surface formed on an inner peripheral surface of the second guide roller 43. As illustrated in FIG. 1, a second rail groove 43A having a circular annular shape, with which the rail end 15 (track surface) is to be in contact, is formed in an outer peripheral surface of the second guide roller 43. The second guide roller 43 is arranged so that the straight-curved guide rail 2 is interposed between the second guide roller 43 and the first guide roller 33 in the width direction D2. A swing portion (portion including the first bearing portion 21, the second bearing portion 22, and the arm portion 23) of the movable element 3 is moved in the longitudinal direction D1 while the first rail groove 33A and the second rail groove 43A are being in contact with the track surfaces of the pair of rail ends 15, respectively.

As described above, in the low-stiffness region 4 of the straight-curved guide rail 2 according to this embodiment, the stiffness of the portions including the track surfaces is lower than the stiffness of other region. Thus, the track part 12 is more likely to warp. Thus, a shock, which may be generated when a movable element 3 is moved between a rail having low processing accuracy and a rail having high processing accuracy, can be mitigated through warping of the track part 12. Thus, with the straight-curved guide rail 2 according to this embodiment, a shock, which may be generated when the movable element 3 is moved between the rail having low processing accuracy and the rail having high processing accuracy, can be suppressed.

Second Embodiment

Next, a configuration of a straight-curved guide rail 2A according to a second embodiment is described with reference to FIG. 5 to FIG. 8. The second embodiment is basically similar to the first embodiment described above. However, the second embodiment differs from the first embodiment in that first cutout portions 51 are formed in a low-stiffness region 4. Differences from the first embodiment are described below.

Figure 5:
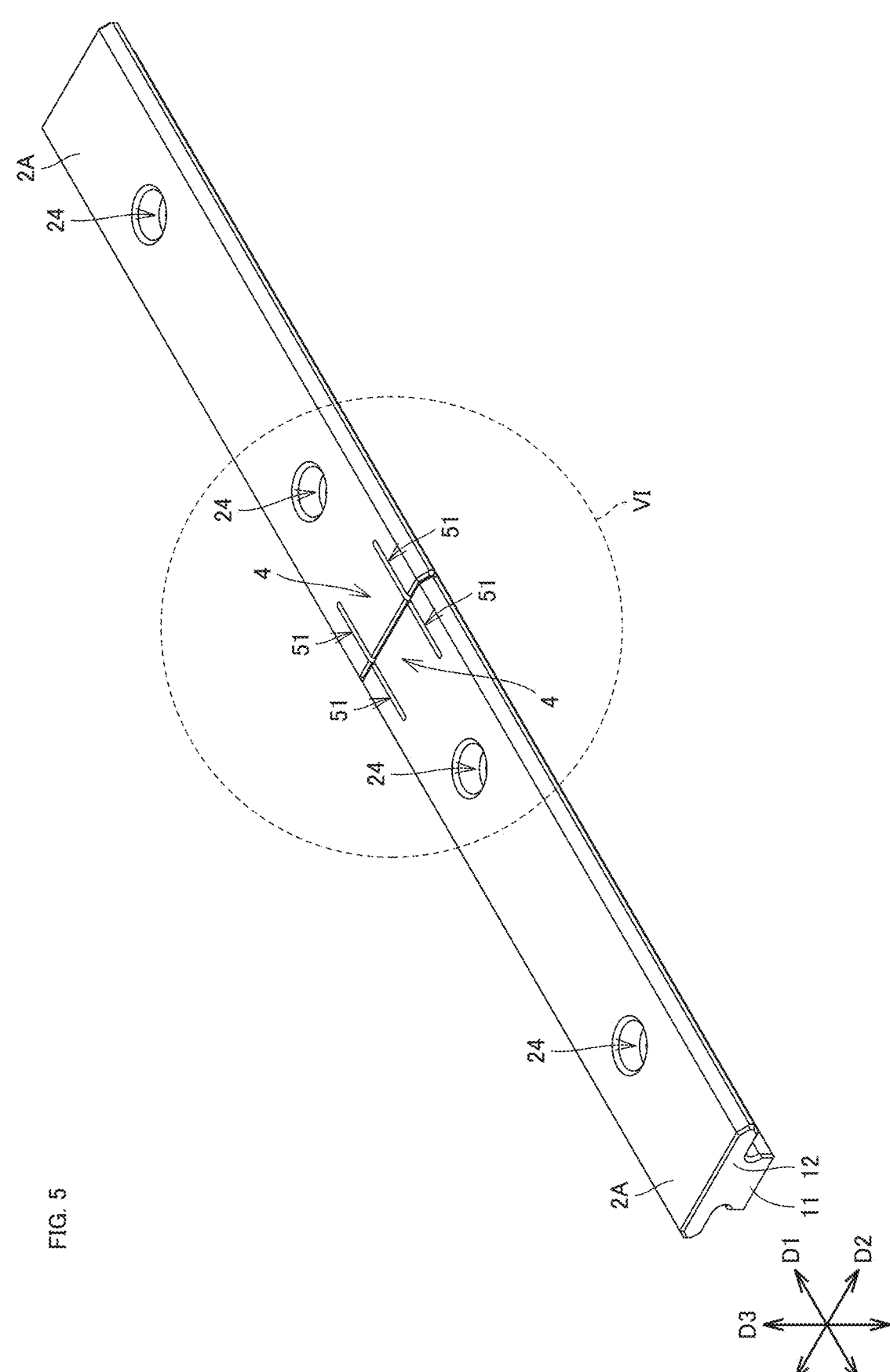
FIG. 5 is a perspective view for illustrating two straight-curved guide rails according to a second embodiment, which are arranged in line in the longitudinal direction.
Figure 6:
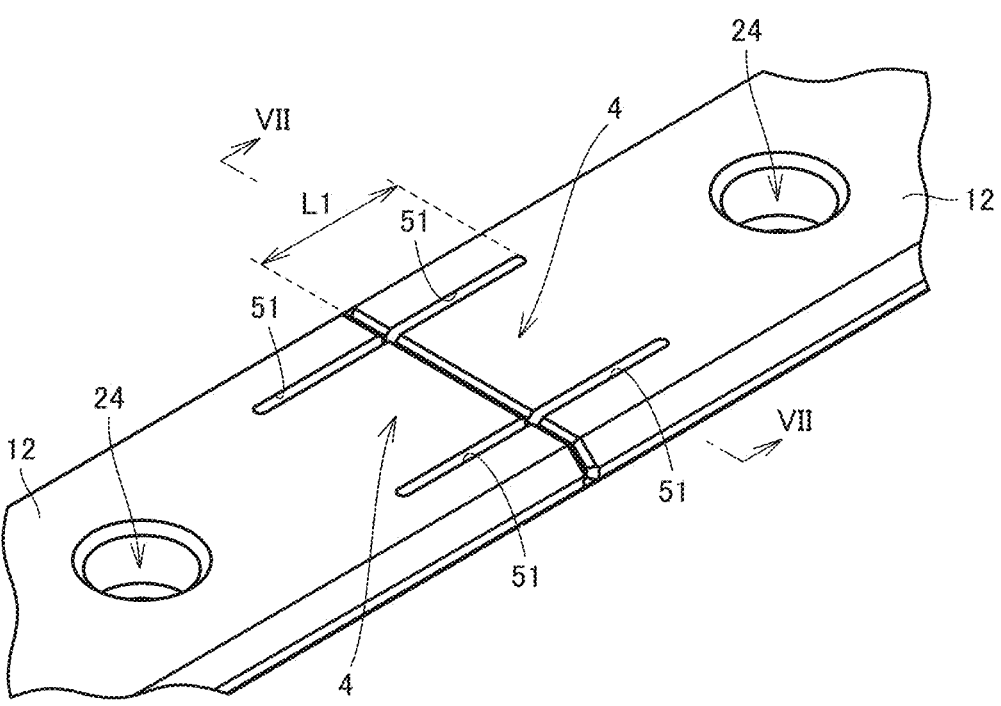
FIG. 6 is an enlarged view of the area VI of FIG. 5.
Figure 7:
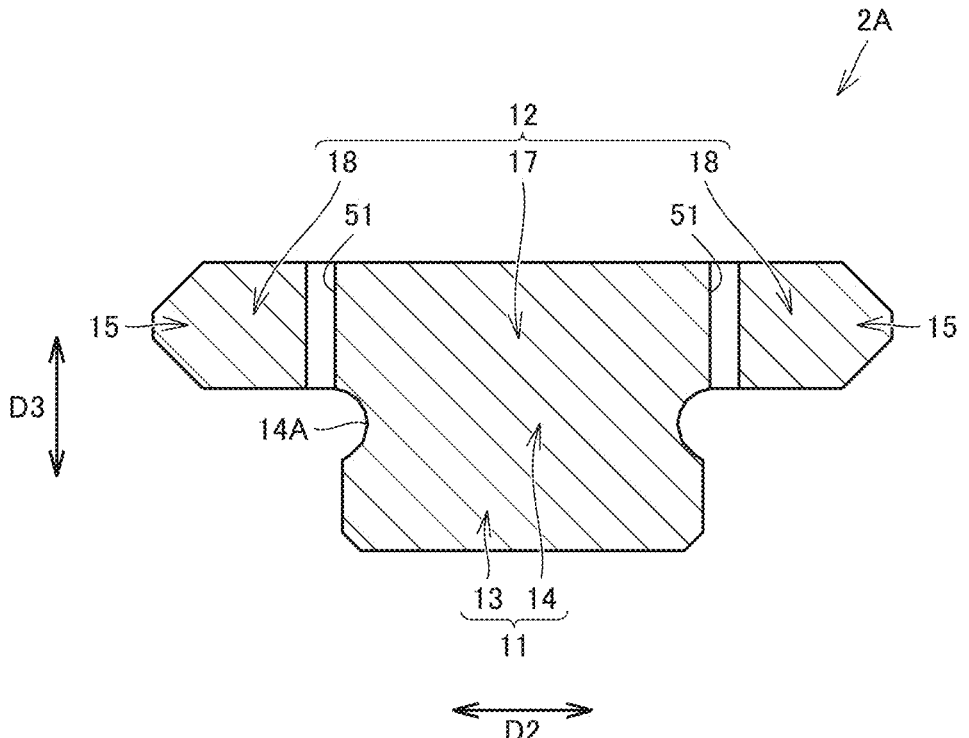
FIG. 7 is a sectional view of the straight-curved guide rail, taken along the line VII-VII of FIG. 6.
Figure 8:
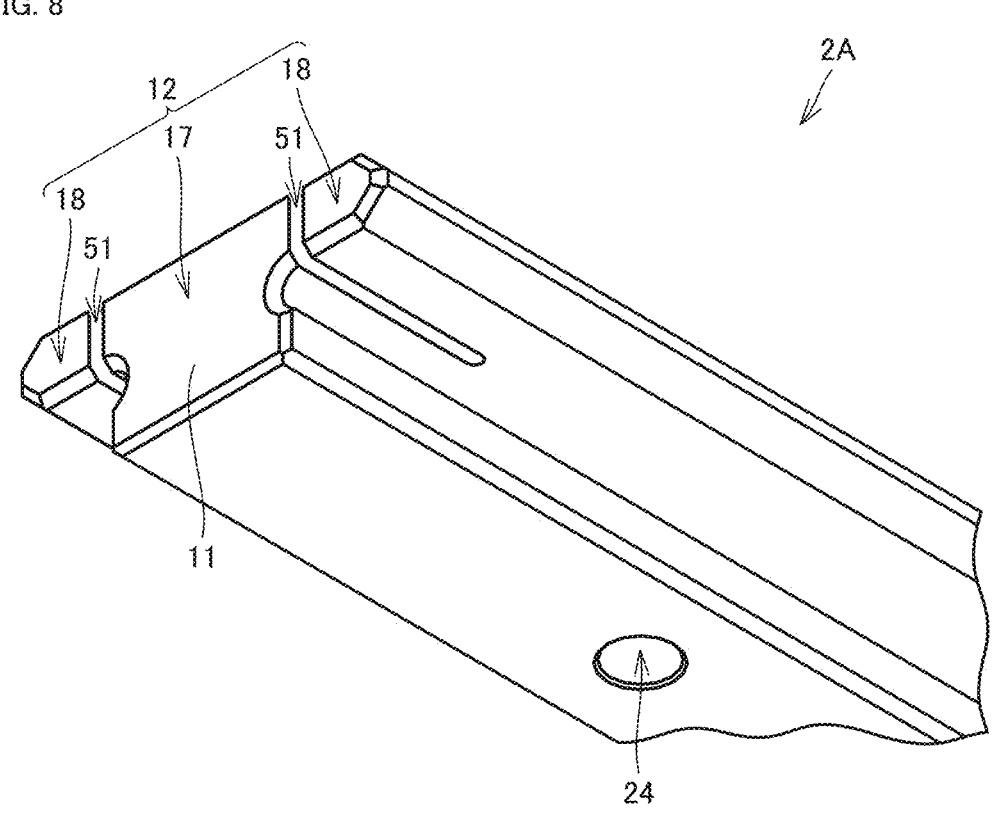
FIG. 8 is a perspective view for illustrating a configuration of a straight-curved guide rail according to the second embodiment.

FIG. 5 is a perspective view for illustrating two straight-curved guide rails 2A, which are arranged in line in the longitudinal direction D1. FIG. 6 is an enlarged view of the area VI of FIG. 5. FIG. 7 is a sectional view of the straight-curved guide rail 2A, taken along the line VII-VII of FIG. 6. FIG. 8 is a perspective view for illustrating a configuration of the straight-curved guide rail 2A.

As illustrated in FIG. 6, in the low-stiffness region 4, a track part 12 has a plurality of (two in this embodiment) first cutout portions 51, which are each formed by cutting out a part of the track part 12 from an end portion of the track part 12 in the longitudinal direction D1. Each of the first cutout portions 51 in this embodiment is a slit linearly extending in the longitudinal direction D1 from the end portion of the track part 12 in the longitudinal direction D1. A length (slit length L1) of the first cutout portion 51 in the longitudinal direction D1 is larger than a length (slit width) of the first cutout portion 51 in the width direction D2. For example, when the first cutout portion 51 is formed by processing with use of a cutting grindstone, the slit width of the first cutout portion 51 is 0.5 mm or larger. Meanwhile, when the first cutout portion 51 is formed by processing with discharge wire cutting, the slit width of the first cutout portion 51 is 0.05 mm or larger. The above-mentioned numerical values of the slit width of the first cutout portion 51 are mere examples, and the slit width is not limited to the numerical values described above.

As illustrated in FIG. 7, in the low-stiffness region 4, the first cutout portions 51 pass through the track part 12 in the height direction D3 and spatially separate a first track part 17 and second track parts 18 from each other. Each of the first cutout portions 51 in this embodiment is a rectangular slit when viewed in the longitudinal direction D1. When the first cutout portions 51 are formed in the track part 12 of the straight-curved guide rail 2A according to this embodiment, stiffness of portions including track surfaces in the low-stiffness region 4 is lower than that in the first embodiment.

In the straight-curved guide rail 2A according to this embodiment, a length of a second base part 14 in the width direction D2 is smaller than a length of a first base part 13 in the width direction D2. In addition, the first cutout portions 51 are formed in the track part 12. Thus, in the low-stiffness region 4, the track part 12 is more likely to warp. Accordingly, with the straight-curved guide rail 2A, a shock, which may be generated when a movable element 3 is moved between a rail having low processing accuracy and a rail having high processing accuracy, can be more effectively suppressed.

Third Embodiment

Next, a configuration of a straight-curved guide rail 2B according to a third embodiment is described with reference to FIG. 9 to FIG. 11. The third embodiment is basically similar to the first embodiment described above. However, the third embodiment differs from the first embodiment in that a second cutout portion 52 and a third cutout portion 53 are formed in the straight-curved guide rail 2B. Differences from the first embodiment are described below.

Figure 9:
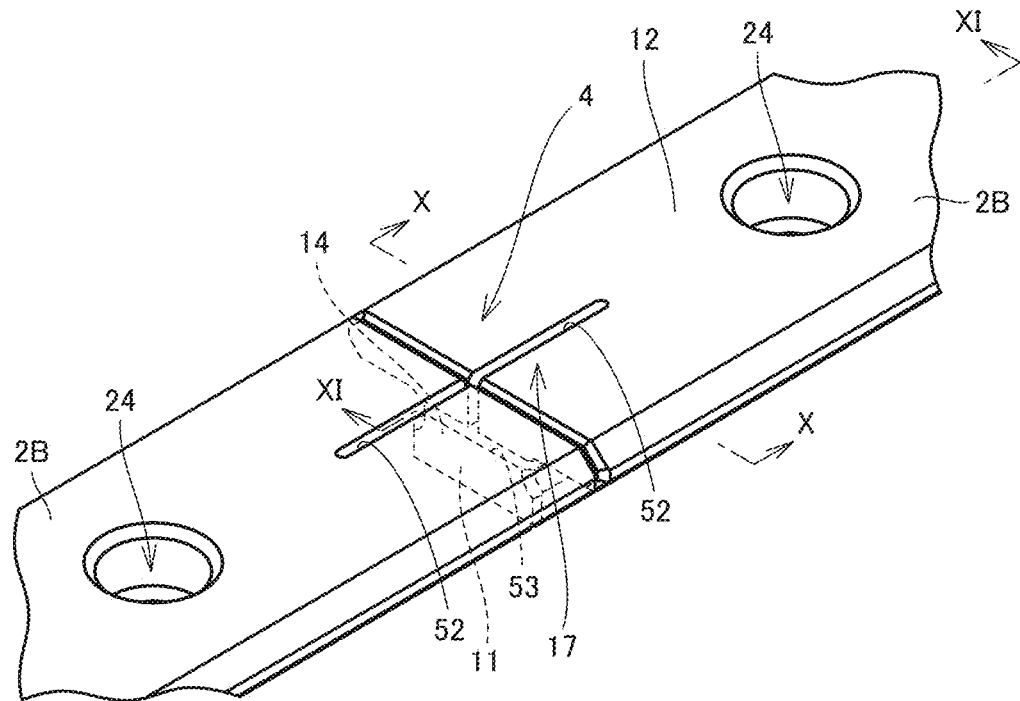
FIG. 9 is a view for illustrating two straight-curved guide rails according to a third embodiment, which are arranged in line in the longitudinal direction.

FIG. 9 is a view for illustrating two straight-curved guide rails 2B, which are arranged in line in the longitudinal direction. FIG. 10 is a sectional view of the straight-curved guide rail 2B, taken along the line X-X of FIG. 9. FIG. 11 is a sectional view of the straight-curved guide rail 2B, taken along the line XI-XI of FIG. 9.

As illustrated in FIG. 9, in a low-stiffness region 4, the second cutout portion 52 is formed in a track part 12. The second cutout portion 52 is formed by removing a part of a first track part 17 from an end portion of the track part 12 in the longitudinal direction D1. The second cutout portion 52 is a slit linearly extending in the longitudinal direction D1 from an end portion of the first track part 17 in the longitudinal direction D1. A length (slit length) of the second cutout portion 52 in the longitudinal direction D1 is larger than a length (slit width) of the second cutout portion 52 in the width direction D2. The slit width of the second cutout portion 52 may be substantially the same as the slit width of the first cutout portion 51 in the second embodiment. However, the slit width of the second cutout portion 52 is not limited to that described above. In the low-stiffness region 4, a base part 11 has the third cutout portion 53. The third cutout portion 53 is formed by removing a part of a second base part 14 from an end portion of the base part 11 in the longitudinal direction D1. The second cutout portion 52 and the third cutout portion 53 communicate with each other. The second cutout portion 52 may be formed by cutting. In this case, the slit width of the second cutout portion 52 is larger than a slit width (length in the height direction D3) of the third cutout portion 53.

Figure 10:
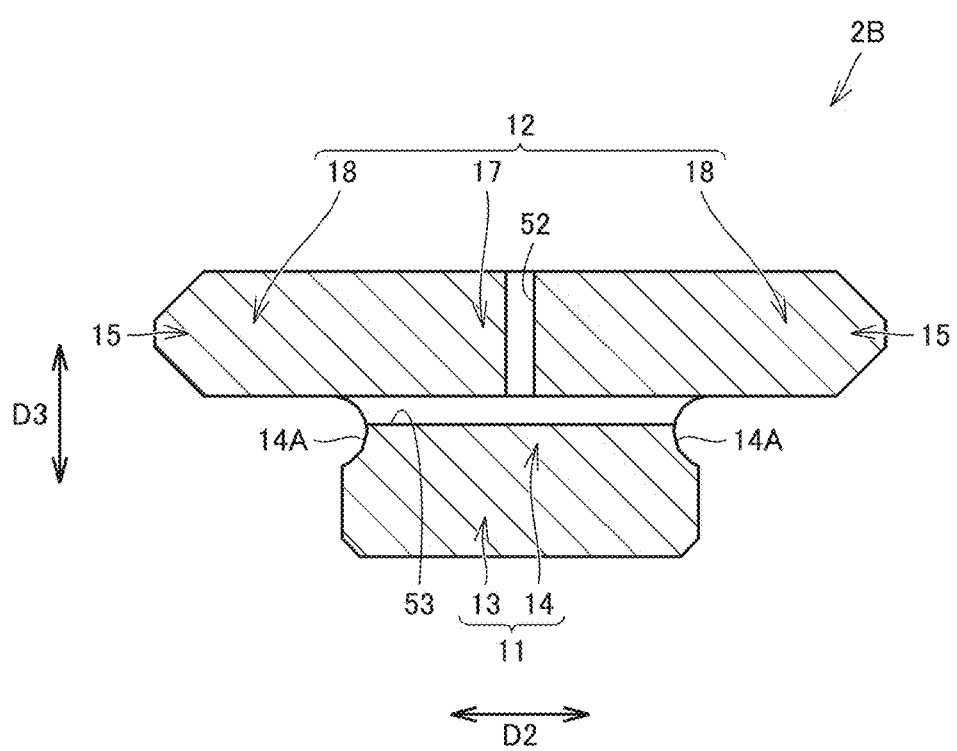
FIG. 10 is a sectional view of the straight-curved guide rail, taken along the line X-X of FIG. 9.
Figure 11:
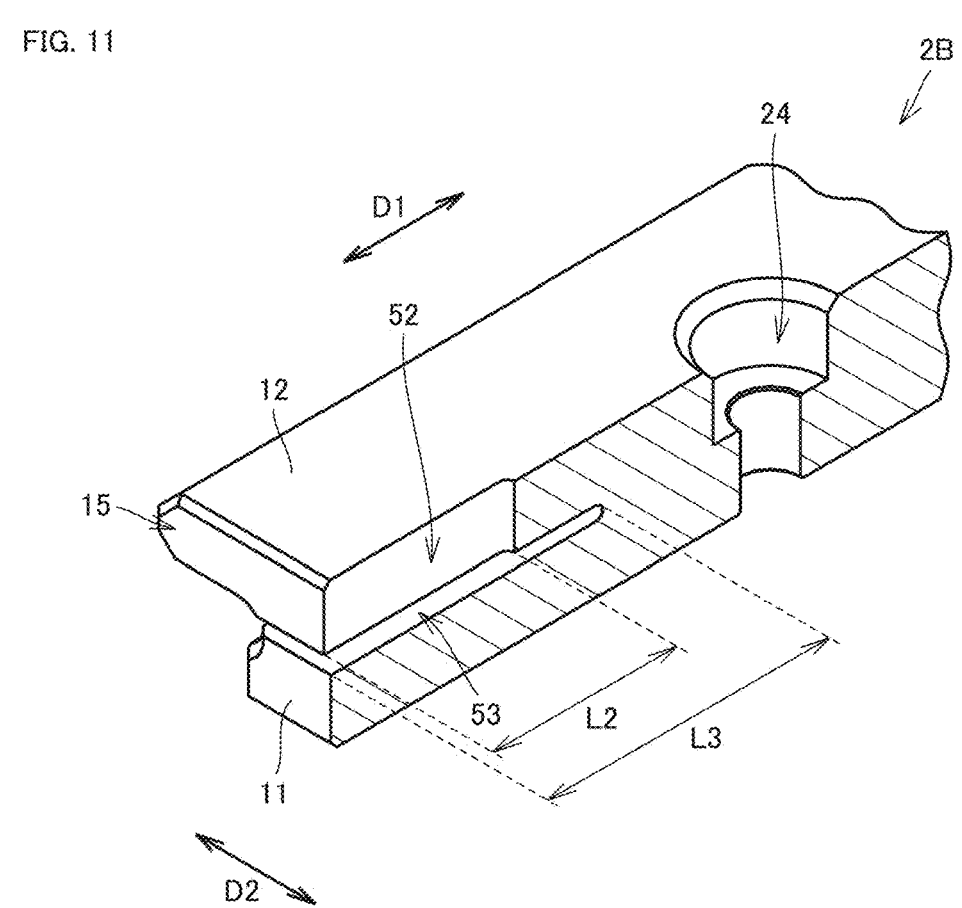
FIG. 11 is a sectional view of the straight-curved guide rail, taken along the line XI-XI of FIG. 9.

As illustrated in FIG. 10, the second cutout portion 52 is a slit extending in the height direction D3 when viewed in the longitudinal direction D1. The second cutout portion 52 passes in the height direction D3 through a substantially center part of a first track part 17 in the width direction D2. The third cutout portion 53 is a slit linearly extending in the width direction D2 when viewed in the longitudinal direction D1. The third cutout portion 53 passes through the second base part 14 in the width direction D2. As illustrated in FIG. 10, the second cutout portion 52 and the third cutout portion 53 are orthogonal to each other when viewed in the longitudinal direction D1. As illustrated in FIG. 11, in this embodiment, a length (slit length L3) of the third cutout portion 53 in the longitudinal direction D1 is larger than the length (slit length L2) of the second cutout portion 52 in the longitudinal direction D1. However, a size relationship therebetween is not limited to that described above.

In the straight-curved guide rail 2B according to this embodiment, a length of the second base part 14 in the width direction D2 is smaller than a length of a first base part 13 in the width direction D2. In addition, the second cutout portion 52 and the third cutout portion 53 are formed. Thus, the track part 12 is more likely to warp in the low-stiffness region 4. Accordingly, with the straight-curved guide rail 2B, a shock, which may be generated when a movable element 3 is moved between a rail having low processing accuracy and a rail having high processing accuracy, can be effectively suppressed.

Fourth Embodiment

Next, a configuration of a straight-curved guide rail 2C according to a fourth embodiment is described with reference to FIG. 12 to FIG. 15. The fourth embodiment is basically similar to the third embodiment described above. However, the fourth embodiment differs from the third embodiment in lack of the third cutout portion and in the size of a second cutout portion (area to be removed from a track part 12). Differences from the third embodiment are described below.

Figure 12:
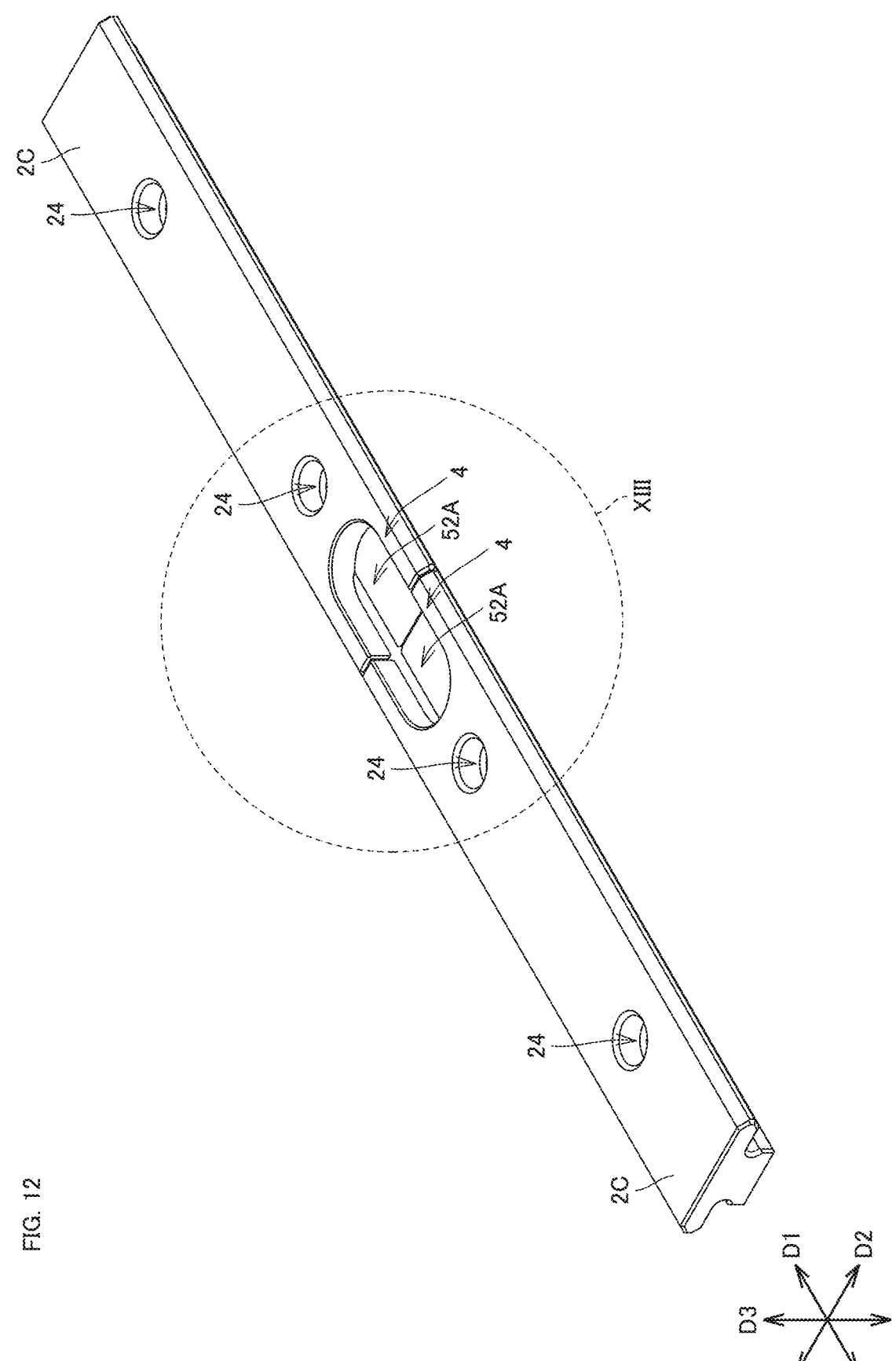
FIG. 12 is a view for illustrating two straight-curved guide rails according to a fourth embodiment, which are arranged in line in the longitudinal direction.
Figure 13:
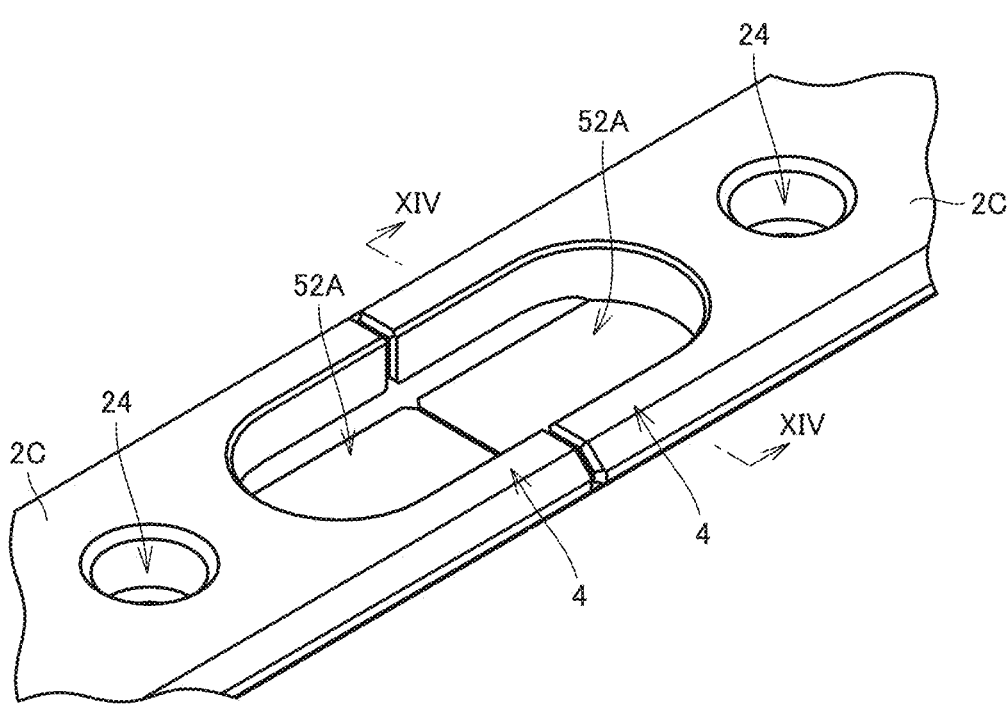
FIG. 13 is an enlarged view of the area XIII of FIG. 12.
Figure 14:
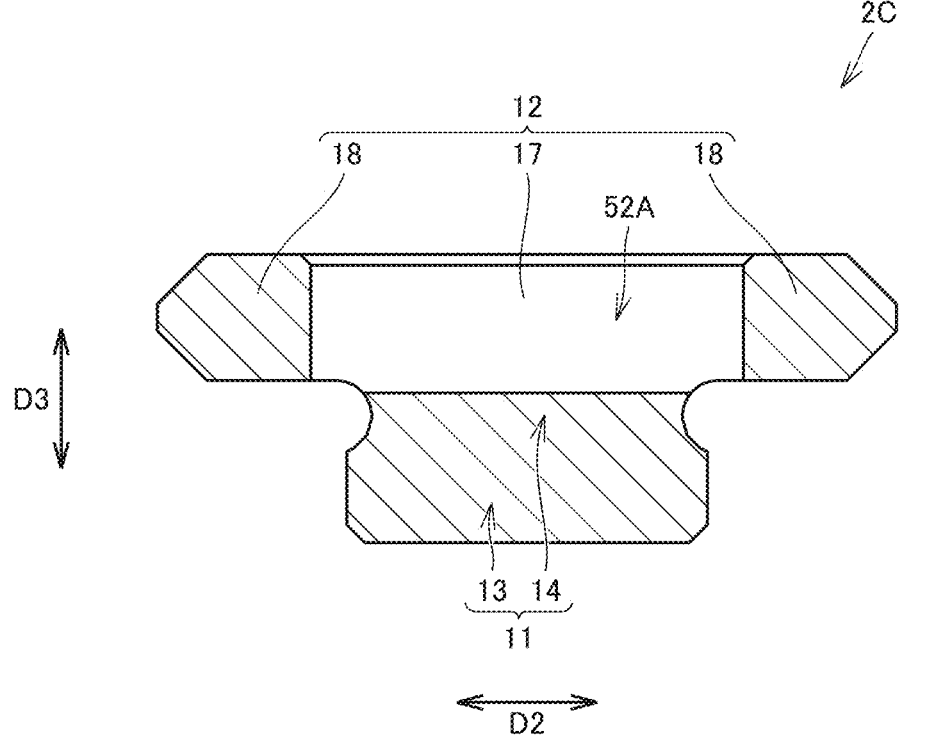
FIG. 14 is a sectional view of the straight-curved guide rail, taken along the line XIV-XIV of FIG. 13.
Figure 15:
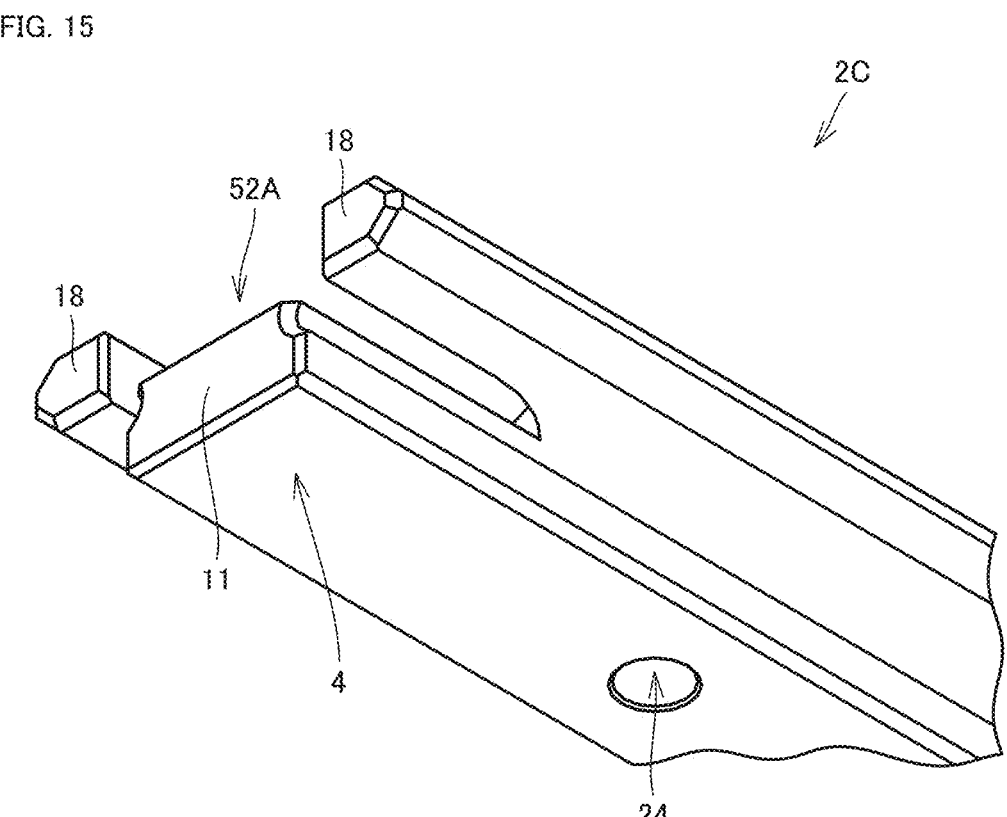
FIG. 15 is a perspective view for illustrating a configuration of the straight-curved guide rail according to the fourth embodiment.

FIG. 12 is a view for illustrating two straight-curved guide rails 2C according to the fourth embodiment, which are arranged in line in the longitudinal direction D1. FIG. 13 is an enlarged view of the area XIII of FIG. 12. FIG. 14 is a sectional view of the straight-curved guide rail 2C, taken along the line XIV-XIV of FIG. 13. FIG. 15 is a perspective view for illustrating a configuration of the straight-curved guide rail 2C.

As illustrated in FIG. 13 and FIG. 14, a second cutout portion 52A in this embodiment is formed by entirely removing a first track part 17 and removing a part (part close to the first track part 17) of each of second track parts 18 in a predetermined range from an end portion of the first track part 17 in the longitudinal direction D1. As illustrated in FIG. 12, the second cutout portion 52A is formed so that its wall surface on a side opposite to the end portion of the straight-curved guide rail 2C in the longitudinal direction D1 has an arc-like shape inwardly curved toward a bolt hole 24.

In the straight-curved guide rail 2C according to this embodiment, an area of the second cutout portion is larger than that in the straight-curved guide rail 2B according to the third embodiment. Thus, the track part 12 is more likely to warp in a low-stiffness region 4. A shock, which may be generated when a movable element 3 is moved between a rail having low processing accuracy and a rail having high processing accuracy, can be effectively suppressed.

Fifth Embodiment

Next, a configuration of a straight-curved guide rail 2D according to a fifth embodiment is described with reference to FIG. 16 to FIG. 19. The fifth embodiment is basically similar to the fourth embodiment described above. However, the fifth embodiment differs from the fourth embodiment in that a third cutout portion 53A is further formed. Differences from the fourth embodiment are described below.

Figure 16:
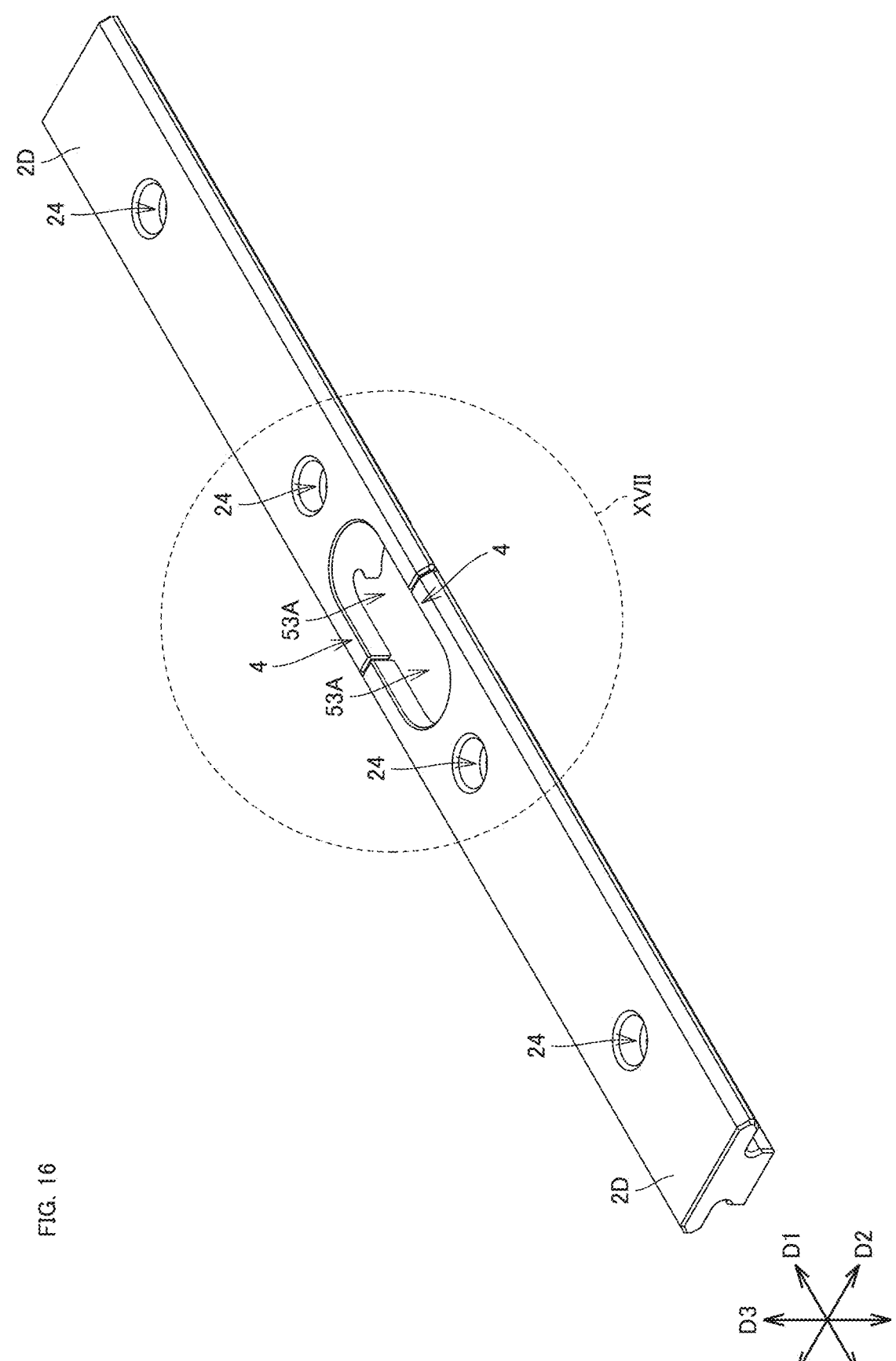
FIG. 16 is a perspective view for illustrating two straight-curved guide rails according to a fifth embodiment, which are arranged in line in the longitudinal direction.
Figure 17:
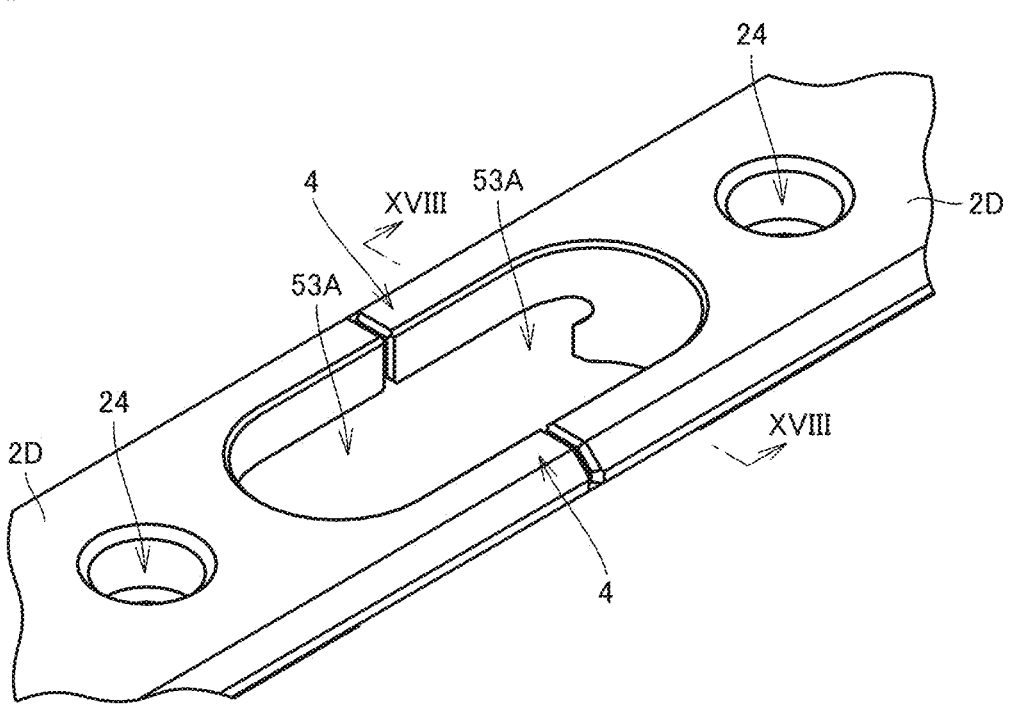
FIG. 17 is an enlarged view of the area XVII of FIG. 16.
Figure 18:
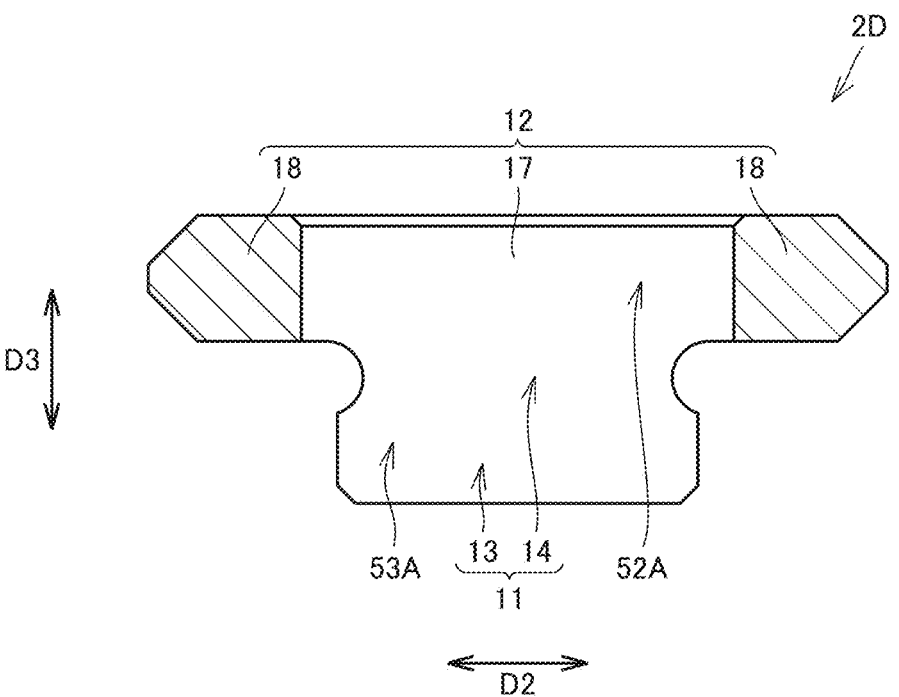
FIG. 18 is a sectional view of the straight-curved guide rail, taken along the line XVIII-XVIII of FIG. 17.
Figure 19:
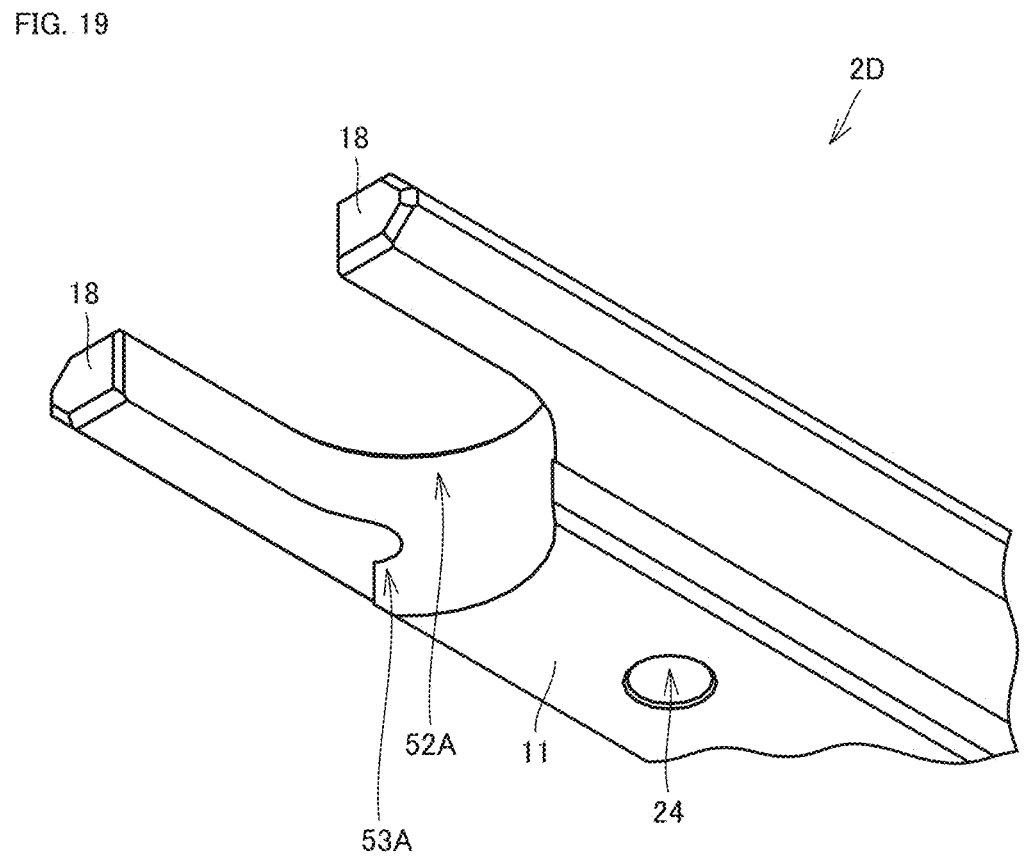

FIG. 16 is a perspective view for illustrating two straight-curved guide rails 2D, which are arranged in line in the longitudinal direction D1. FIG. 17 is an enlarged view of the area XVII of FIG. 16. FIG. 18 is a sectional view of the straight-curved guide rail 2D, taken along the line XVIII-XVIII of FIG. 17. FIG. 19 is a perspective view for illustrating a configuration of the straight-curved guide rail 2D.

As illustrated in FIG. 18 and FIG. 19, in the fifth embodiment, the third cutout portion 53A is formed by cutting out a part of a base part 11 from an end portion of the base part 11 in the longitudinal direction D1. The third cutout portion 53A overlaps a second cutout portion 52A in the height direction D3. As a result, stiffness of portions including track surfaces in a low-stiffness region 4 is lower than that in the fourth embodiment, and thus the rail is more likely to warp.

Other Embodiments

Now, other embodiments are described.

Figure 20:
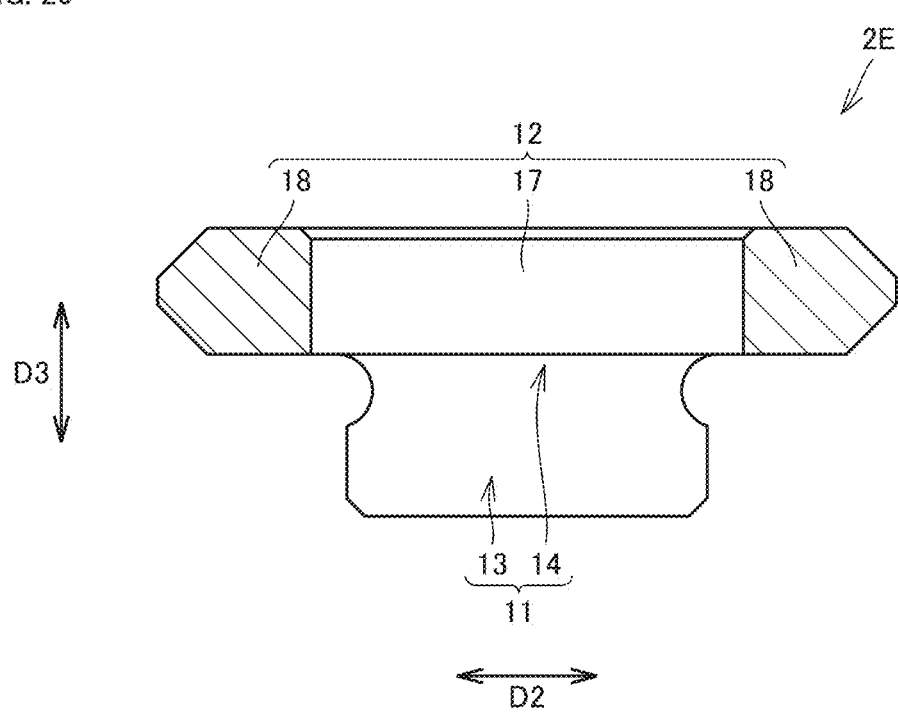
FIG. 20 is a sectional view of a straight-curved guide rail according to another embodiment, taken in a height direction.
Figure 21:
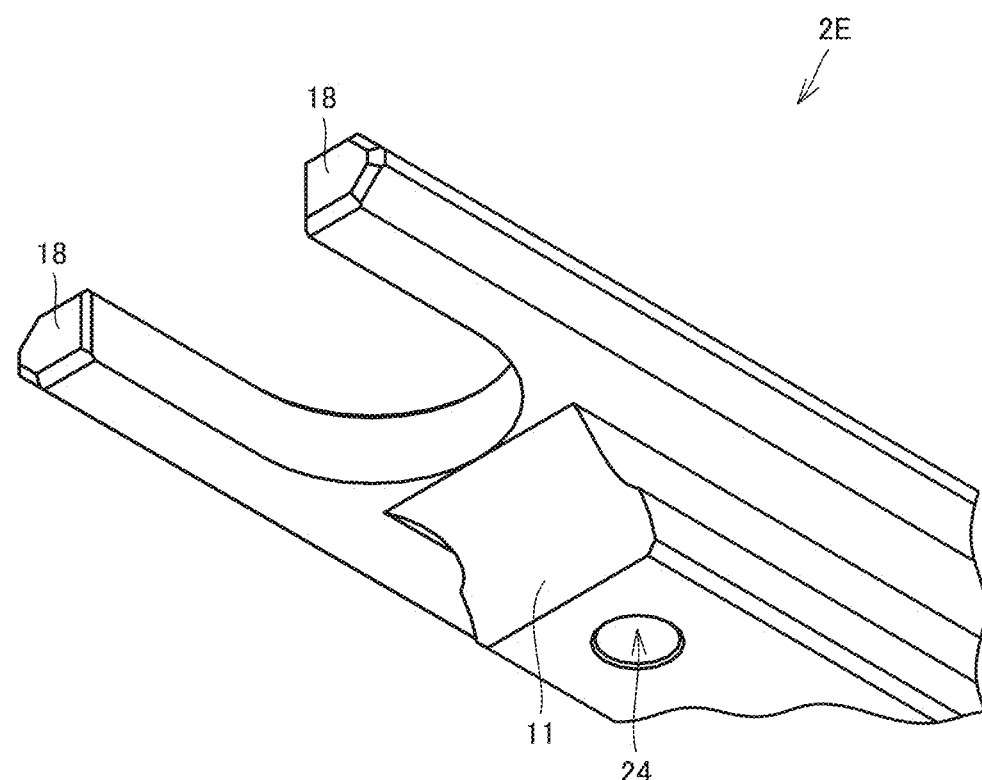
FIG. 21 is a perspective view for illustrating a configuration of the straight-curved guide rail according to the another embodiment.

FIG. 20 is a sectional view of a straight-curved guide rail 2E according to another embodiment, which is taken in the height direction D3. FIG. 21 is a perspective view for illustrating a configuration of the straight-curved guide rail 2E. As illustrated in FIG. 21, in this embodiment, the amount of removal from a base part 11 is larger than that in the fifth embodiment.

Figure 22:
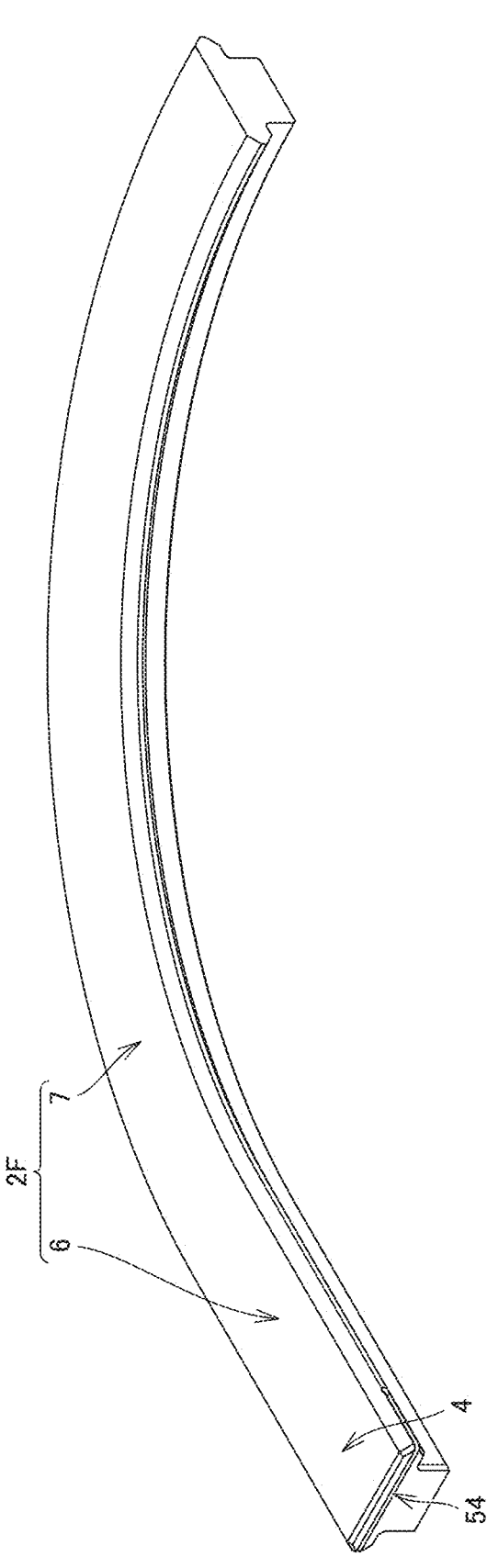
FIG. 22 is a perspective view for illustrating a configuration of a straight-curved guide rail according to a still another embodiment.
Figure 23:
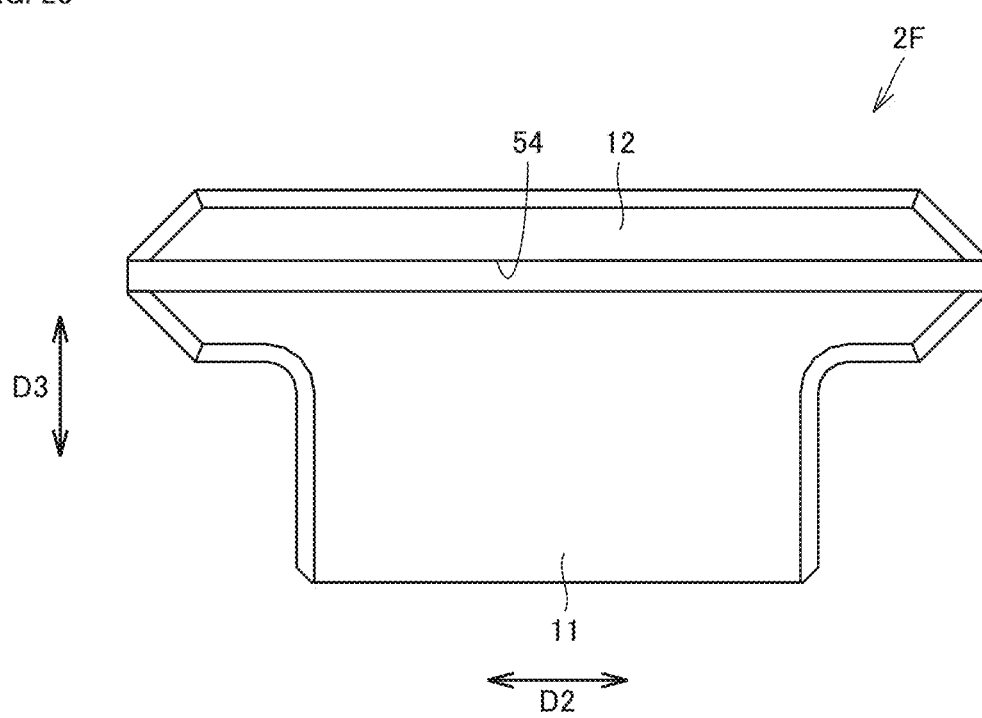
FIG. 23 is a view of the straight-curved guide rail according to the still another embodiment when viewed in the longitudinal direction.
Figure 24:
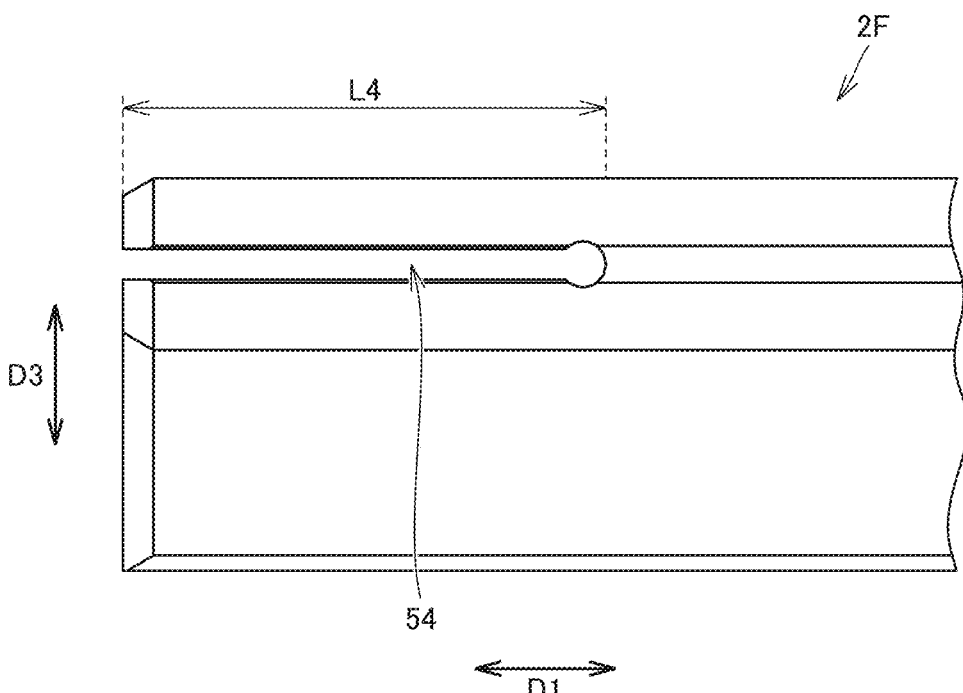
FIG. 24 is a view of an end portion of the straight-curved guide rail according to the still another embodiment in the longitudinal direction when viewed in a width direction.

FIG. 22 is a perspective view for illustrating a configuration of a straight-curved guide rail 2F according to a still another embodiment. FIG. 23 is a view of the straight-curved guide rail 2F when viewed in the longitudinal direction. FIG. 24 is a view of a part of the straight-curved guide rail 2F, which includes its end portion in the longitudinal direction, when viewed in the width direction. As illustrated in FIG. 22, the straight-curved guide rail 2F includes a straight part 6 and a curved part 7. The curved part 7 is connected to an end portion of the straight part 6 in the longitudinal direction.

As illustrated in FIG. 23, in the straight-curved guide rail 2F, a length of a base part 11 in the width direction D2 is constant in the height direction D3. A track part 12 has a fourth cutout portion 54 formed by cutting out a part of the track part 12 from its end portion in the longitudinal direction. As illustrated in FIG. 23, the fourth cutout portion 54 is a slit that linearly extends throughout the track part 12 in the width direction D2. As illustrated in FIG. 24, the fourth cutout portion 54 has a predetermined length (slit length LA) in the longitudinal direction D1 from the end portion of the straight-curved guide rail 2F in the longitudinal direction D1. Thus, a spring property is imparted to a part including the end portion of the straight-curved guide rail 2F in the longitudinal direction D1. Hence, a shock, which may be generated when a movable element 3 is moved between the rails, can be suppressed. As illustrated in FIG. 22, in the straight-curved guide rail 2F, a region in which the fourth cutout portion 54 is formed is a low-stiffness region 4.

In the low-stiffness region 4, a cutout portion may be formed only in the base part 11 while being omitted from the track part 12.

It is to be understood that each of the embodiments disclosed herein is merely an example in all aspects and in no way intended to limit the present disclosure. The scope of the present invention is defined by the appended claims and not by the above description, and it is intended that the present invention encompasses all modifications made within the scope and spirit equivalent to those of the appended claims.

DESCRIPTION OF THE REFERENCE NUMERALS 1 straight-curved guide device, 2,2A,2B,2C,2D,2E,2F straight-curved guide rail, 3 movable element, 4 low-stiffness region, 5 rail central region, 6 straight part, 7 curved part, 11 base part, 12 track part, 13 first base part, 14 second base part, 14A outer surface, 15 rail end, 17 first track part, 18 second track part, 21 first bearing portion, 22 second bearing portion, 23 arm portion, 24,32A bolt hole, 31 first shaft member, 32 first outer ring, 33 first guide roller, 33A first rail groove, 41 second shaft member, 42 nut, 43 second guide roller, 43A second rail groove, 44 eccentric collar, 51 first cutout portion, 52,52A second cutout portion, 53,53A third cutout portion, 54 fourth cutout portion, D1 longitudinal direction, D2 width direction, D3 height direction, L1,L2,L3,L4 slit length

The invention claimed is:

1. A straight-curved guide rail which includes a straight part and a curved part and is configured to guide movement of a movable element, the straight-curved guide rail comprising:
   a base part extending in a longitudinal direction of the straight-curved guide rail; and
   a track part, which is formed on the base part, extends in the longitudinal direction, and has a pair of rail ends, each including a track surface to be in contact with the movable element, on both side portions of the straight-curved guide rail in a width direction of the straight-curved guide rail,
   wherein a region of the straight-curved guide rail, which includes an end portion of the straight-curved guide rail in the longitudinal direction, includes a low-stiffness region in which portions including the track surfaces have lower stiffness than stiffness of another region, the low-stiffness region extending in the longitudinal direction to an end surface of the end portion of the straight-curved guide rail.

2. The straight-curved guide rail according to claim 1, wherein, in the low-stiffness region, the base part includes:
   a first base part having a smaller length in the width direction than a length of the track part in the width direction; and
   a second base part, which connects the first base part and the track part to each other and has a smaller length in the width direction than the length of the first base part in the width direction.

3. The straight-curved guide rail according to claim 2, wherein the track part includes:
   a first track part that overlaps the base part in a height direction of the straight-curved guide rail; and a pair of second track parts, which are formed on both sides of the first track part in the width direction and include the pair of rail ends,
   wherein, in the low-stiffness region, the track part has a first cutout portion formed by cutting out a part of the track part from an end portion of the track part in the longitudinal direction so that the first track part and the second track parts are spatially separated from each other.

4. A straight-curved guide device, comprising:
   the straight-curved guide rail of claim 3; and
   a movable element being movable on the straight-curved guide rail.

5. The straight-curved guide rail according to claim 2, wherein the track part includes:
   a first track part that overlaps the base part in a height direction of the straight-curved guide rail; and
   a pair of second track parts, which are formed on both sides of the first track part in the width direction and include the pair of rail ends,
   wherein, in the low-stiffness region, the track part has a second cutout portion formed by removing the first track part from an end portion of the track part in the longitudinal direction.

6. A straight-curved guide device, comprising:
   the straight-curved guide rail of claim 5; and
   a movable element being movable on the straight-curved guide rail.

7. A straight-curved guide device, comprising:
   the straight-curved guide rail of claim 2; and
   a movable element being movable on the straight-curved guide rail.

8. The straight-curved guide rail according to claim 1, wherein the track part includes:
   a first track part that overlaps the base part in a height direction of the straight-curved guide rail; and
   a pair of second track parts, which are formed on both sides of the first track part in the width direction and include the pair of rail ends,
   wherein, in the low-stiffness region, the track part has first cutout portions, each being formed by cutting out a part of the track part from an end portion of the track part in the longitudinal direction so that the first track part and the second track parts are spatially separated from each other.

9. A straight-curved guide device, comprising:
   the straight-curved guide rail of claim 8; and
   a movable element being movable on the straight-curved guide rail.

10. The straight-curved guide rail according to claim 1, wherein the track part includes:
   a first track part that overlaps the base part in a height direction of the straight-curved guide rail; and
   a pair of second track parts, which are formed on both sides of the first track part in the width direction and include the pair of rail ends,
   wherein, in the low-stiffness region, the track part has a second cutout portion formed by removing the first track part from an end portion of the track part in the longitudinal direction.

11. A straight-curved guide device, comprising:
   the straight-curved guide rail of claim 10; and
   a movable element being movable on the straight-curved guide rail.

12. A straight-curved guide device, comprising:
   the straight-curved guide rail of claim 1; and a movable element being movable on the straight-curved
  guide rail.

* * * * *